United States Patent [19]

Stephany et al.

[11] Patent Number: 4,728,972

[45] Date of Patent: Mar. 1, 1988

[54] MULTIPLEXING OF TRANSIENT IMAGE BAR

[75] Inventors: Joseph F. Stephany, Williamson; Virgil J. Hull, Perinton; Eugene C. Faucz, Webster; Alain E. Perregaux, Pittsford, all of N.Y.

[73] Assignee: Xerox Corporation, Stamford, Conn.

[21] Appl. No.: 62,376

[22] Filed: Jun. 15, 1987

Related U.S. Application Data

[63] Continuation of Ser. No. 906,478, Sep. 12, 1986, abandoned.

[51] Int. Cl.⁴ .............................................. G01D 15/14
[52] U.S. Cl. ...................................... 346/160; 346/154
[58] Field of Search .................. 346/154, 160, 107 R; 364/518, 519, 523; 350/332–337; 358/300, 302, 241; 400/119; 101/DIG. 13; 377/64, 67, 27, 76; 340/800, 801

[56] References Cited

U.S. PATENT DOCUMENTS

| | | | |
|---|---|---|---|
| 3,786,486 | 1/1974 | Torresi | 340/336 |
| 3,878,537 | 4/1975 | Roncillat et al. | 340/324 |
| 4,308,534 | 12/1981 | Yamamoto | 340/784 |
| 4,427,978 | 1/1984 | Williams | 340/784 |
| 4,595,259 | 6/1986 | Perregaux | 350/331 R |
| 4,633,242 | 12/1986 | Sekiya | 350/332 |
| 4,649,404 | 3/1987 | Ohta et al. | 346/154 |

Primary Examiner—Arthur G. Evans
Attorney, Agent, or Firm—Ronald F. Chapuran

[57] ABSTRACT

The invention is a liquid crystal material between horizontal and vertical electrodes. A xerographic drum is placed underneath the electrodes/liquid crystal configuration and an optical system provides light or no light at the intersection of the electrodes to be focused on the xerographic drum. A single line of data is created by printing first the odd elements of the data and then the even elements. First, data is clocked into a shift register coincident with clock pulses. This is the data for the next line to be printed or displayed and not the presently printed or displayed line of odd bits. When the new line has been completely shifted in, a latch pulse transfers the data to latches, a one line parallel in parallel out buffer. Then, on the even half of the cycle, the even bits of data which have been shifted in while the odd dots are being printed, are latched to the drivers.

12 Claims, 7 Drawing Figures

MULTIPLEXING OF TRANSIENT IMAGE BAR

This is a continuation of application Ser. No. 906,478, filed Sept. 12, 1986, now abandoned.

BACKGROUND OF THE INVENTION

1. Field of Invention

The present invention relates to liquid crystal devices used in electrophotographic printers as light valves and, and in particular, to the multiplexing of electronic drivers for a liquid crystal device in a printer.

2. Description of the Prior Art

In a typical transmissive type, liquid crystal device, a thin layer of liquid crystal material is sandwiched between parallel, transparent glass substrates bearing transparent, patterned electrodes on their inner confronting surfaces. At least one polarizer is located on the outer surface of one of the glass substrates and a light source spaced from the device directs light therethrough. By selectively applying an electric field across the layer of liquid crystal material by means of selectively applying an AC voltage to the electrodes, the transmissivity of the liquid crystal device may be changed for passing or blocking light in accordance with the electrodes addressed by the voltage. It is known, as disclosed in U.S. Pat. No. 4,595,259 assigned to the same assignee as the present invention, that the transient response of a liquid crystal light valve can be used as an image bar for the purpose of printing optical images on xerographic drums.

The prior art is replete with multiplexing driving circuits, in particular, as applied to liquid crystal displays, for example, U.S. Pat. Nos. 3,786,486, 3,873,537, 4,427,798, and 4,308,534. The above-identified references, however, are for use with a display system. Thus, in the display mode, a part of the display is strobed and this information is written on a line. The line is then left in an unaccessed state until the next strobe pulse. During this unaccessed period, in the above-identified references, it is important that the information remain displayed as long as possible to make efficient use of the illuminating light source.

It would be desirable, however, to provide a multiplexing system for use in a print bar system rather than in a display system, and to provide a multiplexing system to reduce the number of drivers. It is still another object of the present invention to place a section of the printer in an unaccessed state while another section of the printer begins printing in in order to have no data displayed which would be blurred or smeared. Further objects and advantages of the present invention will become apparent as the following description proceeds and the features characterizing the invention will be pointed out with particularity in the claims annexed to and forming a part of this specification.

SUMMARY OF THE INVENTION

Briefly, the present invention involves a liquid crystal material between horizontal and vertical electrodes. A xerographic drum is placed underneath the electrodes/liquid crystal configuration and an optical system provides light or no light at the intersection of the electrodes to be focused on the xerographic drum. A single line of data is created by printing first the odd elements of the data and then the even elements. First, data is clocked into a shift register coincident with clock pulses. This is the data for the next line to be printed or displayed and not the presently printed or displayed line of odd bits. When the new line has been completely shifted in, a latch pulse transfers the data to latches, a one line parallel-in-parallel out buffer. Then, on the even half of the cycle, the even bits of data which have been shifted in while the odd dots are being printed, are latched to the drivers.

BRIEF DESCRIPTION OF THE DRAWINGS

For a better understanding of the present invention, reference may be had to the accompanying drawings wherein the same reference numerals have been applied to like parts and wherein.

DESCRIPTION OF THE INVENTION

Figure 1:
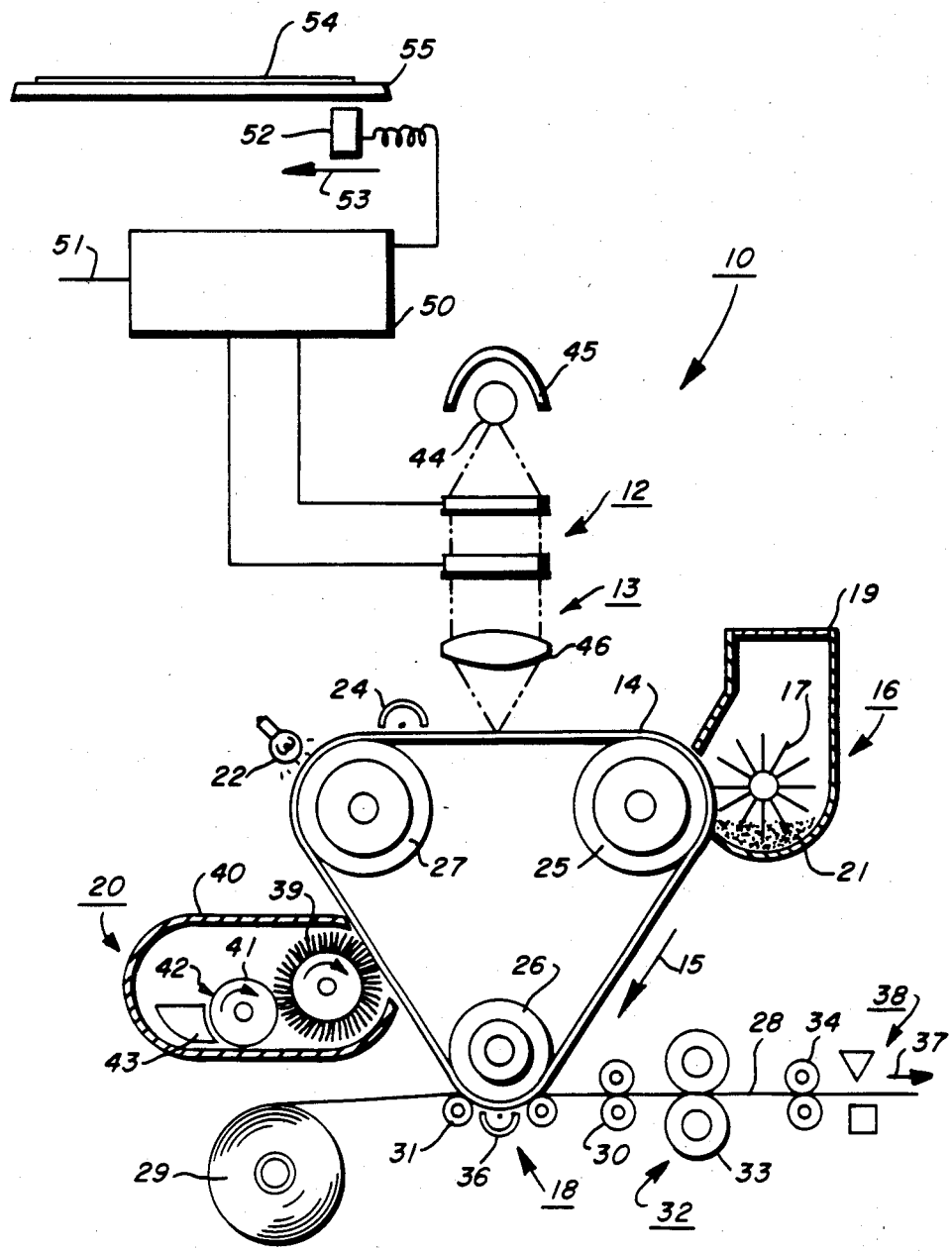
FIG. 1 is an elevational view of an electrophotographic printer incorporating the liquid crystal image bar and multiplexing system of the present invention.

Referring to the system diagram of FIG. 1, there is shown an electrophotographic printer 10 utilizing a liquid crystal image bar 12. The printer 10 includes a series of process stations through which a photoconductive member 14 in the form of a endless belt passes. Although the preferred embodiment depicts an endless belt configuration for the photoconductive member, various other configurations (not shown) could be used such as, for example, a cylindrical drum.

Beginning with the imaging station 13, whereat the latent electrostatic image is formed, the photoconductive member 14 proceeds in the direction of arrow 15 around guide rollers 25, 26 and 27, past development station 16, transfer station 18, cleaning station 20, erase lamp 22 and precharging corona generating device 24 prior to returning to the imaging station. At development station 16, a rotating magnet brush or paddle wheel 17, housed in hopper 19, presents toner particles 21 onto the surface of the photoconductive member 14 as it moves around guide roller 25. The toner particles 21 are charged with a polarity opposite the charges placed on the photoconductive member by the corona generating device 24 by means well known in the art by either triboelectric charging technique or by a corona generating device (not shown) or both. The toner particles are attracted and held by the latent electrostatic image recorded on the photoconductive member at the imaging station, thus devloping and rendering the latent image visible. The developed image is transferred to a permanent material 28, such as paper, at the transfer station 18. After the developed image is transferred, the photoconductive member proceeds past the cleaning station 20 where all residual toner particles are removed.

The developed image is electrostatically transferred to the paper at the transfer station 18. The paper is provided by supply roll 29 which is pulled through the transfer station via drive rolls 30 and through a toner particle fusing station 32 by drive rolls 34, where the developed image on the paper is permanently fixed thereto by means well known in the prior art, such as, by fusing rolls 33 which apply heat and pressure to the developed image. A pair of idler rollers 31 are positioned to maintain the paper in intimate contact with the photoconductive member at guide roller 26, while transfer corona generating device 36 places an electric charge of opposite polarity to that of the charged toner particles to the back side of the paper. The magnitude of the charge from corona generating device 36 is greater than that of the latent electrostatic image to facilitate the transfer of the developed image to the paper. This electrostatic transfer technique is well established in the prior art along with many variations thereof.

Cutter assembly 38 cuts the paper 28 with the fixed images into separate sheets as the paper moves in the direction of arrow 37 and exits from the printer 10 into a collection tray or sorter (not shown). Subsequent to the developed image transfer, the photoconductive member 14 is moved past the cleaning station 20, which removes any residual toner particles not transferred to the paper. A soft rotating brush 39, housed in chamber 40, removes the residual toner from the photoconductive member 14 and a single conductive, electrically biased roll 41 is used to remove the toner particles from the brush 39. A conventional flicker bar (not shown) is arranged to assist in toner particle removal from the soft brush and a doctor blade 42 is used on the biased roll 41 to scrape the toner particles therefrom into a collecting tray 43, so that the toner particles collected may be reused if that is desired.

The imaging station comprises a light source 44 and reflector 45 which illuminates a liquid crystal image bar 12, more fully discussed later. Light selectively passed through the image bar is focused by lens means 46 which may be one or more single lens, a selfloc lens system or a plurality of miniature lens associated with fiber optics. The image bar 12 selectively passes light to form latent electrostatic images one line at a time by erasing or discharging the image background areas. The image bar is formed by a single row of dot shutters actuated by selective application of a voltage to the plurality of electrodes on one of the substrates of the image bar. An electronic controller or microcomputer 50 energizes the appropriate electrodes in response to digitized data from a scanning means such as a charged coupled device (CCD) 52 or digitized data from a source outside the printer 10, for example, from a character generator, computer or other means for storing and retrieving data via conduit 51. If a scanning CCD is used, it scans one line of information at a time from a stationary document 54 placed on a transparent, fixed platen 55. The CCD scanning speed in the direction of arrow 53 is substantially the same as the speed of the photoconductive member if real time imaging is to occur. Otherwise, a means for storing the document digitized data would have to be included in the electronic controller.

Figure 2B:
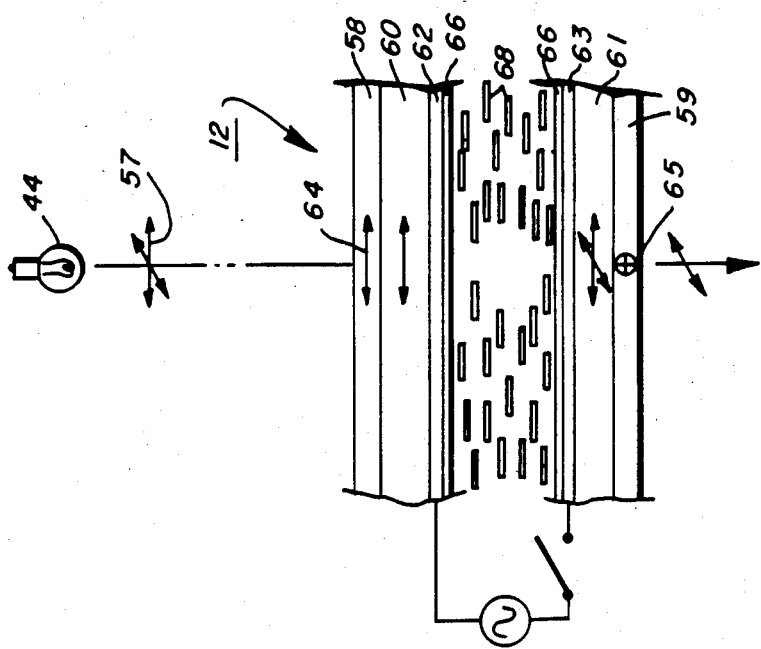
FIG. 2b is the same as FIG. 2a except that the electrodes are not energized as shows the orientation of the molecules in their relaxed state with light being passed because the polarizers are positioned at a 45° angle.
Figure 2A:
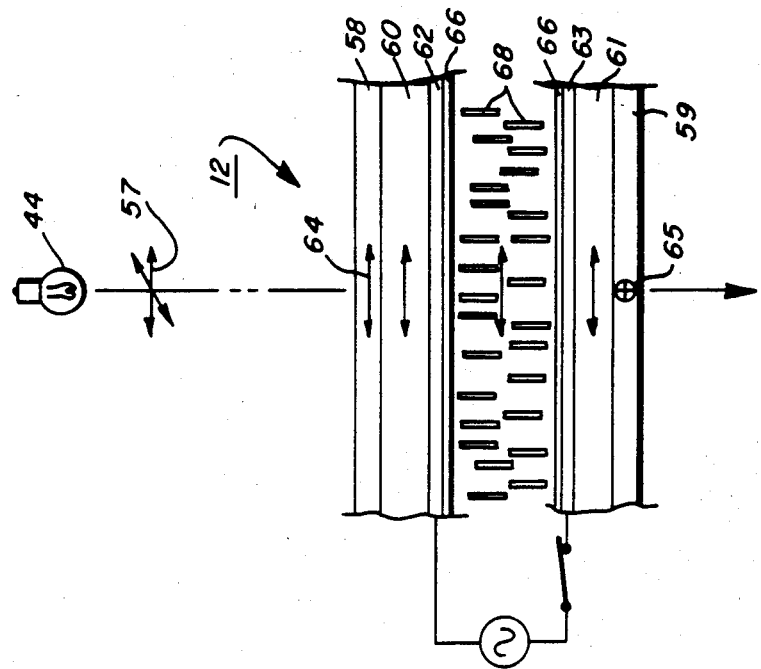
FIG. 2a is a cross-sectional elevational view of the crystal liquid image bar of FIG. 1 showing the orientation of liquid crystal molecules in the stable "on" or energized state with light being blocked by cross polarizers.
Figure 3:
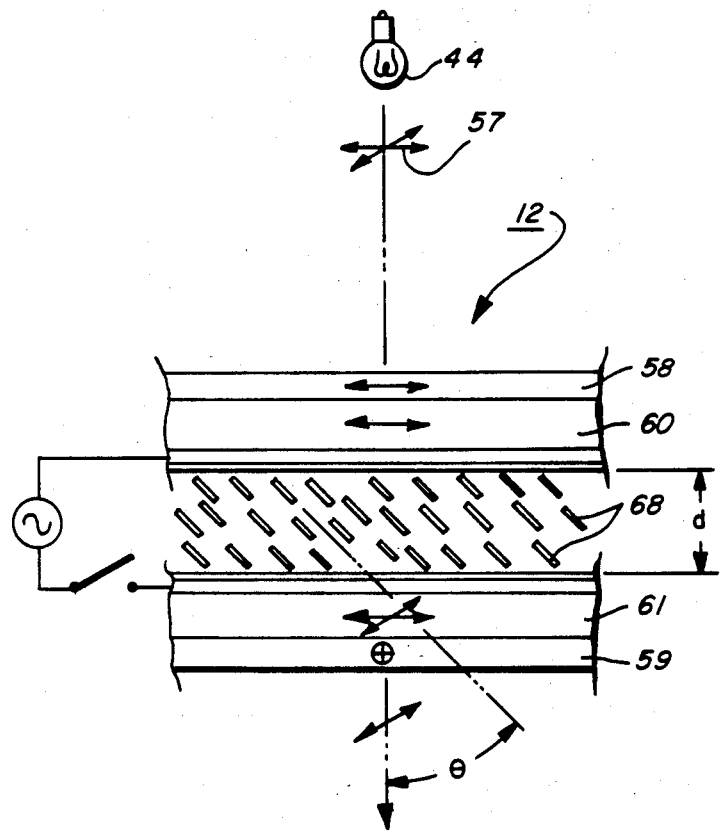
FIG. 3 is a cross-sectional elevation view of the image bar of FIG. 1, showing the orientation of the liquid crystal molecules in the transient of transmissive state.

The image bar is shown in FIGS. 2a, 2b and 3, wherein a transmissive, neumatic liquid crystal device 12 is depicted. Crossed polarizers 58, 59 such as, for example, Polaroid HN32 polarizers marketed by the Polaroid Corporation, are attached to each of the outside surfaces of the two parallel, transparent glass substrates 60, 61. Transparent electrodes 62, 63 are placed on the inner, confronting surfaces of the glass substrates. A light shield 49, shown in FIG. 4 and more fully described later, forms a slit 46 along the center portion of electrode 62 which runs the length of the liquid crystal device. A transparent alignment layer 66 covers the electrodes 62, 63 and the light shield. A thin layer of nematic liquid crystal material, such as Merck No. 1132 from the E. Merck Company of Darmstadt, W. Germany, is positioned between the glass substrate surfaces having the electrodes 62, 63. The liquid crystal materials knows as E7 or E44 manufactured by the British Drug House (BDH), Poole, England are also suitable materials for an image bar.

The polarizing axes of the two polarizers 58, 59 are positioned on the glass substrates 60, 61 so that they are mutually perpendicular to each other and so that they are at a 45 degree angle with respect to the main axes of the liquid crystal molecules 68 when the molecules are in their relaxed state as shown in FIG. 2b. Light depicted as vectors 57 from source 44 enters the liquid crystal material through the polarizer 58 on glass substrate 60. However, only the light vector parallel to the transmission axis 64 of polarizer 58 enters the liquid crystal material and, because of the orientation of the polarizers with respect to the main axis of the liquid crystal molecules in their relaxed state, as shown in FIG. 2b, the amount of light that is transmitted by the second polarizer 59 is strongly wavelength dependent. In other words, due to birefringence of liquid crystal molecules, the light transmitted by the system in its nonenergized state (FIG. 2b) is made of a complex color mixture. In the electrically driven state as shown in FIG. 2a, the polarized light is blocked by the second polarizer 59 on glass substrate 61, because the transmission axis 65 of polarizer 59 is perpendicular to that of polarizer 58 and because the state of polarization of the light is essentially left unmodified by the liquid crystal molecules regardless of wavelength.

When the printer 10 is placed in the operating mode, all of the electrodes are energized to maintain the liquid crystal molecules in their stable electrically driven state as shown in FIG. 2a. In the crossed polarizer configuration, the transient state is the bright state or transmissive state as seen in FIG. 3.

As is well known in electrophotography, any position of the photoconductive member which receives light becomes conductive and dissipates surface charges thereon. Accordingly, to form a latent electrostatic image, the background regions of the image must be exposed to light. Therefore, when a liquid crystal device is used as an image bar, it is the transmissive state which is used as an erasure state and, accordingly, it must be short and well controlled if latent images are to be produced on a moving photoconductive member by it one line at a time. As a general rule, if a succession of black and white lines are to be printed, the time allocated to the transmissive state or phase must be roughly ½ of the time needed to print two lines. This rule is a consequence of the combination of two facts; namely, the transmissive phase is an erasure phase and the photoconductive member is constantly moving.

As a typical example, the time that can be allocated for the liquid crystal image bar to reach a transmissive or clear state is 1.0 millisecond. Thus, in the case of 250 lines per inch resolution, which is a reasonably good resolution in xerography, the photoconductive member speed of movement must be about two inches per second.

Figure 4:
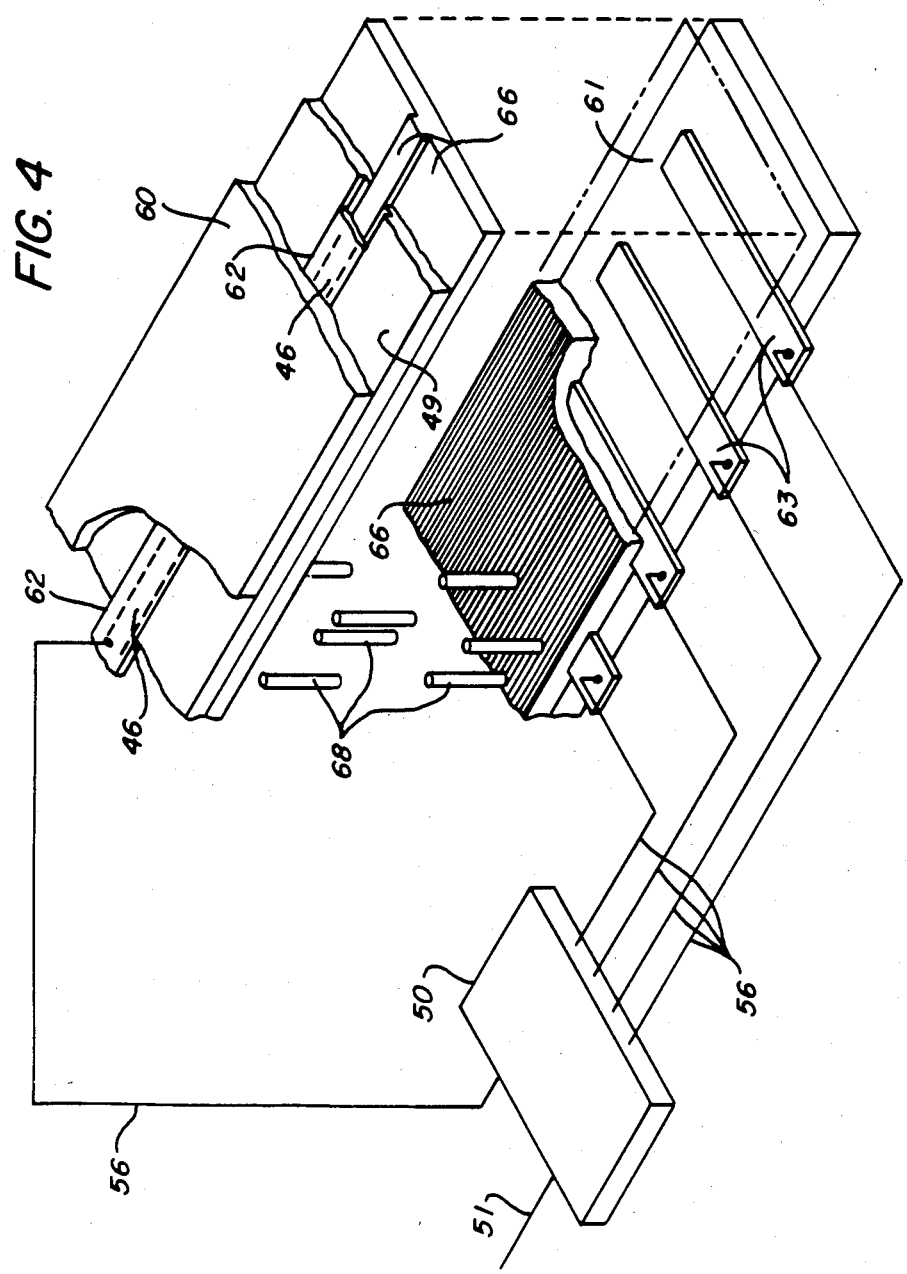
FIG. 4 is an enlarged, partially sectioned, perspective view of a schematic diagram of a portion of the liquid crystal image bar of FIG. 1 with transparent glass substrates which form a linear array of dot shutters and showing the light shield which forms a light passing slit along the center portion of the transparent electrode on one of the glass substrates.

FIG. 4 shows schematically the simple electrode configuration for the image bar used in the preferred embodiment. A single transparent electrode 62 runs length of the inner surface of the upper glass substrate 60. Light shield 49 covers the inner surface of glass substrate 60 and overlaps the edges of electrodes 62 so that a slit 46 is centrally formed along the length of the electrode 62. A plurality of transparent, parallel electrodes 63 are formed on the inner surface of the lower glass substrate 61. The plurality of electrodes 63 are equally spaced from each other and are perpendicular to the electrode 62. The density of the plurality of electrodes are about 10 per millimeter, thus forming one single array of dot shutters to be used as image bar to produce latent electrostatic images on a photoconductive member. The electronic controller 50 is connected to the electrodes 62, 63 via leads 56; electrode 62 is connected to a fixed reference zero voltage by the controller 50. The plurality of electrodes 63 are generally connected to suitable drivers providing a 50 volt RMS square wave at 5 to 10 KHz until light from source 44 is to be transmitted, whereupon the applied voltage to the desired electrode 63 is interrupted. For further details of the liquid crystal image bar, reference is made to U.S. Pat. No. 4,595,259, issued June 17, 1986 and incorporated herein.

Figure 5:
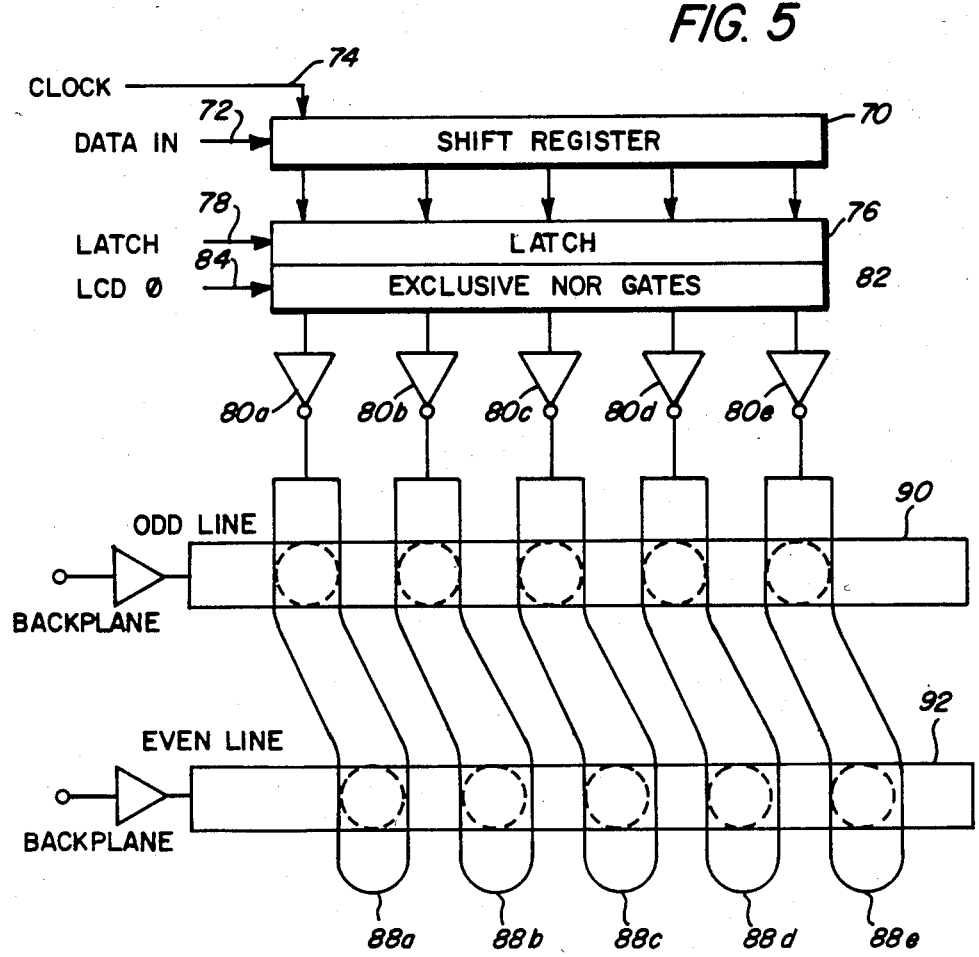
FIG. 5 is a block diagram of the multiplexing technique in accordance with the present invention.

With reference to FIG. 5, there is shown a multiplexing scheme in accordance with the present invention. In particular, there is illustrated a shift register 70 having data in and clock input pulses 72, 74 from controller 50 and suitably connected to a latch circuit 76. The latch circuit 76 receives a latch signal 78 input from controller 50 and is electrically connected to a plurality of data drivers 80a-8e through an array of exclusive NOR gates, illustrated at 82, suitably activated by LCD signals 84 from controller 50. The data drivers 80a-80e are connected to a plurality of transparent conductors or electrodes 88a-88e, equivalent to the electrodes 63 shown in FIG. 4. Interconnected to the electrodes 88a-88e are a pair of back plane electrodes 90, 92 to form an array of intersecting electrodes. The electrodes 88a-88e are illustrated as being offset between the back plane conductors 90, 92 to illustrate the marking of pixels or dots on the drum or web corresponding to a line of odd bits and a line of even bits. The liquid crystal can be multiplexed to a degree that is only limited by the time of response of the liquid crystal and the amount of light available. The number of electronic drivers is reduced by essentially time sharing the output of each driver so that it will drive more than one picture element in the printer.

As illustrated, there are two conductors or electrodes in the horizontal direction and a multiplicity of electrodes in the vertical direction. The horizontal and vertical electrodes are not in the same plane and the liquid crystal material is placed between them. A multiplex ratio of 2:1 is assumed for illustration purposes, but the system is perfectly capable of working at any higher multiplex ratio provided that there is sufficient light intensity available and the liquid crystal response is fast enough. This can be done by adding more back plane electrodes and extending the vertical electrodes.

It is also assumed that light passing through to the photoconductive member 14 will discharge the belt while light not passing through the liquid crystal will produce an undischarged area on the belt, in turn, to be printed as a black dot. Further, it is assumed that the member 14 is turning in the vertical direction in order that the printing of odd and even dots will eventually be merged by the motion into a single line.

In operation, a single line of data is created by printing first odd elements of the data and then the even elements. Data is first clocked into the shift register 70 coincident with clock pulses from controller 50. This data for the next line to be displayed, not the presently displayed line consists of only odd bits to be printed. When this new line has been completely shifted in, a latch pulse transfers the data to the latches 76, a one line parallel in parallel out buffer. Then, on the even half the the cycle, the even bits of data, which have been shifted in to register 70 while the odd dots are being printed, are latched to the rivers 80a-80e.

Figure 6:
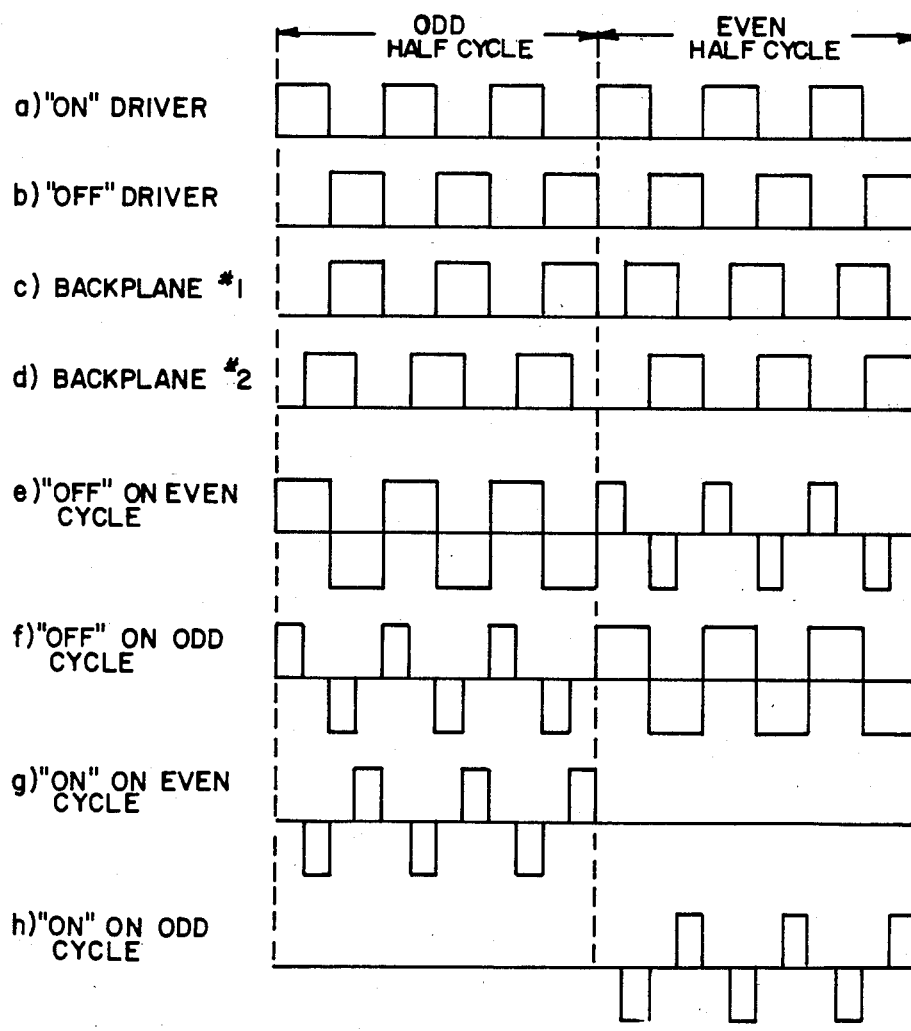
FIGS. 6a through 6h are illustrative wave forms of the signals in the diagram of FIG. 5 accoding to the present invention.

The corresponding wave forms are shown in FIGS. 6a through 6h. The "on" drivers have wave shapes as illustrated in FIG. 6a while the "off" drivers have the wave shapes as illustrated in FIG. 6b. During the course of the cycle, the phase modulation is provided by the LDE O signal input to the exclusive NOR gates 82. It is assumed that an "on" element prints a black dot in the final copy paper that will be printed after the xerographic web is exposed to the output of the image bar.

While FIGS. 6a and 6b illustrate the voltages applied by the drivers 80a-80e to the vertical conductors or electrodes 88a-88e, back plane 90 has the wave form as illustrated in FIG. 6c applied to it while back plane 92 has the wave form as illustrated in FIG. 6d applied to it. Depending upon whether an "on" or "off" element occurs, the wave forms as illustrated in FIGS. 6e through 6f are formed. In the case that only black dots are to be printed, that is, the light is blocked and there is no discharge of the photoreceptor, wave forms 6e and 6f occur and apply voltage throughout the printing cycle. As illustrate, the wave form 6e is the difference between wave form 4a and 4c and wave form 6f is the difference between wave forms 6b and 6c.

Wave form 4g results when no black dot is printed during the even part of the cycle. For this wave form, the applied voltage is used as the "activate" voltage to set up the condition for the occurrence of a transient state and then the transient state occurs in the even half of the cycle, where the voltage applied is 0, thereby discharging the photoreceptor. Similarly, the same condition occurs during the odd half of the cycle where it is assumed that a similar transient setup peiod has occurred just before the zero voltage state. It should be noted that wave form g is the difference of wave forms a and b and wave form h is the difference of wave forms b and d. It should be noted that to produce a white spot, it is necessary to reduce the pixel voltage to zero. On the other hand, if the driver is turned on to turn the element off, a dark spot will be produced on the paper.

In order to use the transient effect of the liquid crystal material as disclosed above in U.S. Pat. No. 4,595,259, it is necessary to apply a voltage to all elements prior to the application of the signal voltages, in order to align the liquid crystal molecules for the transient effect. This is referred to as the "setup" time. After this setup voltage has been applied, if the voltage is held on the liquid crystal, a white spot on the paper is produced. If the voltage is reduced to zero after the setup time, a black spot is produced on the final document. The reason for using the transient effect rather than conventional effects is that it is faster, and the printer may be run at a considerably higher speed. But the setup voltage must proceed the printing step.

It is seen that the multiplexed system described produces exactly the waveforms needed for the transient effect to work. The setup voltage is identical to the blanking voltage of the unaddressed backplane. The voltages necessary to turn on or off a pixel thereby producing a black or white spot on the document paper using the transient effect, is just the voltages shown.

In summary, the purpose of the multiplexing is to reduce the number of drivers. Therefore, it is necessary to access one part of the printer with the data to be printed. After the data has been entered and printed, this section of the printer is placed in an unaccessed state while another part of the printer prints. When in the unaccessed state, it is necessary to have no data displayed which blurs or smears the data. In order to accomplish this removal of information, a wave form which is shifted by 90 electrical degrees is introduced to the back plane of the unaccessed section of the printer in order that a voltage occurs to shut off the printed elements of this part regardless of whether or not the drivers are in the "on" or "off" state. This prevents the reprinting of data that was accessed in the previous cycle which would result in erroneous print operation.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

We claim:

1. An improved liquid crystal image bar for use in an electrophotographic printer of the type having a moving photoconductive member, means for pre-charging the photoconductive member prior to the formation of latent electrostatic images, means for developing the latent images with toner particles, means for transferring the developed images to permanent record sheets, means for fusing the developed images to the record sheets and means for cleaning the photoconductive member before it is pre-charged, the image bar being used to form the latent images on the photoconductive member one line at a time in response to digitized data signals during the operating mode of the printer, including:

a liquid crystal material;
 first and second parallel, elongated glass substrates enclosing the liquid crystal material, each of the glass substrates having inner and outer surfaces, the inner surfaces confronting each other and being spaced a predetermined distance from each other;
 a first plurality of transparent electrodes being located on the inner surface of the first glass substrate and a predetermined, equally spaced second plurality of transparent mutually parallel electrodes being located on the inner surface of the second glass substrate, the electrodes on the second glass substrate being perpendicular to the electrode on the first glass substrate;
 a transparent film being coated over the electrodes on each of the inner surfaces of the first and second glass substrates;
 parallel polarizers being positioned on each of the outer surfaces of the glass substrates;
 an illuminating means for directing light towards a one of the polarizers from a location spaced therefrom;
 an alternating voltage source;
 means for energizing the electrodes by connecting them to the voltage source to prevent the passage of light through the image bar during the operating mode of the printer;
 means for de-energizing selected ones of the second plurality of electrodes on said one glass substrate for a predetermined time period followed by immediate energization thereof in response to receipt of digitized data signals, de-energization of each selected electrode for the predetermined time period followed by energization thereof being a cycle which causes a momentary passage of light through the image bar in the vicinity of said cycled electrode, the momentarily passed light being a burst of light which impinges on the moving photoconductive member to discharge a precharged region on the photoconductive representing a pixel thereon, thus, forming one line of a latent electrostatic image by the discharge of pixels representing the background regions of the latent image, the improvement comprising:
 a shift register, one portion of said digitized data signals representing one portion of said one line being clocked into the shift register while another portion of said digitized data signals forms a latent electrostatic image of another portion of said one line.

2. An improved control for a liquid crystal image bar for use in an electrophotographic printer of the type having a moving photoconductive member, means for pre-charging the photoconductive member prior to the formation of latent electrostatic images, means for developing the latent images with toner particles, means for transferring the developed images to permanent record sheets, means for fusing the developed images to the record sheets and means for cleaning the photoconductive member before it is pre-charged, the image bar being used to form the latent images on the photoconductive member one line at a time in response to digitized data signals during the operating mode of the printer, the liquid crystal image bar including:

first and second parallel, elongated glass substrates, each having inner and outer surfaces, the inner surfaces confronting each other and being spaced a predetermined distance from each other;
 a first plurality of transparent electrodes being located on the inner surface of the first glass substrate and a predetermined, equally spaced second plurality of transparent mutually parallel electrodes being located on the inner surface of the second glass substrate, the electrodes on the second glass substrate being perpendicular to the electrode on the first glass substrate;
 a transparent film being coated over the electrodes on each of the inner surfaces of the first and second glass substrates;

parallel polarizers being positioned on each of the outer surfaces of the glass substrates;

an illuminating means for directing light towards a one of the polarizers from a location spaced therefrom;

an alternating voltage source;

a plurality of drivers connected between the voltage source and the electrodes for modulating the digitized data signals to form a first portion of said one line of said latent image on the photoconductive member;

a shift register, a second portion of the digitized data signals being clocked into the shift register while the first portion of said one line of said latent image is being formed on the photoconductive member; and a buffer connected to the shift register for latching the second portion of the digitized data signals to the drivers after the first portion of said one line has formed the latent image.

3. The improved control of claim 2 wherein the buffer is a parallel in parallel out buffer.

4. The improved control of claim 2 wherein the first plurality of transparent electrodes includes a first back plane conductor for forming the odd pixels of the latent image and a second back plane conductor for forming the even pixels of the latent image.

5. The improved control of claim 4 where the back plane signals are square waves 90° out of phase.

6. The improved control of claim 2 including an array of exclusive NOR gates interconnected between the shift register and the drivers.

7. A control for a liquid crystal image bar for use in an electrophotographic printer of the type having a moving photoconductive member, the image bar being used to form the latent images on the photoconductive member in response to data signals during the operating mode of the printer, the liquid crystal image bar including:

first and second transparent substrates, each having inner and outer surfaces, the inner surfaces confronting each other and being spaced a predetermined distance from each other;

at least one transparent electrode being located on the inner surface of the first transparent substrate and a predetermined plurality of spaced transparent electrodes being located on the inner surface of the second transparent substrate, the electrodes on the second transparent substrate being in a relationship to the electrode on the first transparent substrate;

a voltage source;

a plurality of drivers connected between the voltage source and the electrodes for modulating the signals to form a first portion of said latent image on the photoconductive member;

a register, a second portion of the data signals being entered into the register while the first portion of said latent image is being formed on the photoconductive member; and a buffer connected to the register for latching the second portion of the data signals to the drivers after said first portion of said latent image has been formed.

8. The control of claim 7 wherein the buffer is a parallel in parallel out buffer.

9. The control of claim 7 wherein at least one transparent electrode includes a plurality of back plane conductors, and pixels of the latent image.

10. The control of claim 9 wherein certain of the back plane signals are square waves 90° out of phase.

11. The control of claim 7 wherein the register is a shift register.

12. The control of claim 7 wherein the register is a plurality of distinct buffers.

* * * * *